United States Patent [19]

Easwaran et al.

[11] 3,984,233

[45] Oct. 5, 1976

[54] FERROUS METAL NETWORK IMPREGNATED WITH RARE EARTH METALS

[75] Inventors: Jairaj Easwaran, Toledo, Ohio; George S. Foerster, Hightstown, N.J.

[73] Assignee: NL Industries, Inc., New York, N.Y.

[22] Filed: Feb. 12, 1975

[21] Appl. No.: 549,356

[52] U.S. Cl. .................................. 75/58; 75/130 R
[51] Int. Cl.² .................... C21C 7/02; C22C 33/08
[58] Field of Search ........................... 75/58, 130 R

[56] References Cited
UNITED STATES PATENTS

| | | | |
|---|---|---|---|
| 3,396,777 | 8/1968 | Reding | 75/65 R |
| 3,459,541 | 8/1969 | Hohl | 75/130 A |
| 3,492,118 | 1/1970 | Mickelson | 75/130 R |
| 3,634,066 | 1/1972 | Matthews | 75/65 R |
| 3,637,373 | 1/1972 | Bylund | 75/58 |

*Primary Examiner*—Peter D. Rosenberg

[57] ABSTRACT

A composition of matter comprising a mass of ferrous scrap pieces compressed together in random orientation forming a network of interlocking pieces has been prepared.

This ferrous metal network is impregnated with rare earth metals in amount from 15% to 80% by weight of the impregnated body. The rare earth metal impregnated body is useful for treating high melting metals, particularly to deoxidize or desulfurize steel and to produce nodular iron.

8 Claims, No Drawings

FERROUS METAL NETWORK IMPREGNATED WITH RARE EARTH METALS

BACKGROUND OF THE INVENTION

In the iron and steel industry, it is necessary to treat the ferrous base metals while in the molten state with a desulfurizing agent to reduce the sulphur content of the metal product.

Magnesium metal is a powerful deoxidizer and desulfurizer. However, this metal boils at relatively low temperatures and therefore, the sudden increase in volume which is produced when the magnesium metal is added to the molten iron, may result in violent reactions as the magnesium is vaporized.

Various methods have been used to reduce this violent activity by slowly introducing the magnesium into molten ferrous metal under rigidly controlled systems. One of these methods for reducing the violence using magnesium metal is to impregnate porous bodies with the magensium metal and to plunge the infiltrated body into the molten ferrous metal. Under these conditions, the impregnated magnesium metal is released at a slow enough rate that the violence is held to minimum.

The scrap ferrous metal network described above has been impregnated with magnesium metal. This impregnated network is more fully described and claimed in our copending applications Ser. No. 454,951 filed Mar. 26, 1974 and Ser. No. 514,630 filed Oct. 15, 1974.

In some applications, however, magnesium metal is not effective. For instance in desulfurizing steel, it is very difficult to reach the desirably low sulfur levels with magnesium and other agents. Also in producing ductile iron, if impurities such as lead and tin are present, good nodularization of the graphite may not be obtained by the addition of magnesium alone. In these cases the problems can be overcome by employing rare earth metals instead of, or in addition to, magnesium metal.

Rare earths are reactive elements however, which oxidize rapidly, particularly in the molten state. Since they are very expensive, high efficiency is essential. Rare earths are currently added to ferrous melts in several ways. The rare earths may be placed at the bottom of a ladle just before the melt is poured in or may be attached as "donuts" on a rod and plunged in the melt. Rare earths can also be added as silicides but the concurrent addition of Si may introduce problems. Good efficiency can be achieved by using relatively dilute alloys such as Fe-30 Si-2Mg-2RE, but these alloys are expensive and the introduction of silicon may pose problems.

In contrast to the prior art, the instant invention provides means to introduce rare earth metals into molten iron or steel in a porous ferrous briquette. This is accomplished by impregnating the compressed ferrous metal network briquettes of the copending applications cited above with rare earth metal instead of with magnesium metal. These briquettes impregnated with rare earth metals are added in such a way that they remain below the melt surface until they have substantially dissolved. The gradual dissolution of the briquettes introduce rare earths into the melt at a controlled rate so that they can be efficiently utilized. The scrap portion of the briquette is ferrous metal (usually mild steel) and introduces no undesirable impurities into the melt.

The metal network, prepared in the copending applications which serve as the carrier for the rare earth metals, comprises a mass of scrap ferrous metal pieces compressed together in random orientation, forming a network of interlocking pieces, said mass having a density of 1.2 to 6.3 g/cc, a porosity of 20% to 85%, and a short transverse tensile strength of at least 2.0 psi, preferably at least 2.5 psi.

This mass of porous ferrous metal network contains a labyrinth of interstices in the voids between the compressed interlocking metal pieces. These interstices may be filled with rare earth metal by immersing the ferrous metal network in molten rare earth metal and solidifying the molten metal impregnated throughout the interstices of the porous metal network. The amount of rare earth metal which may be impregnated into the ferrous metal mass may be from 15% to 80% by weight of the impregnated body. This product is useful for treating ferrous melts, for example, for desulfurizing steel and also for producing nodular iron. Normally about ½ to 2 pounds of rare earth metal are used to desulfurize 1 ton of molten steel. The same amounts of rare earth metals also are used to treat one ton of nodular iron. Usually iron is or steel is treated first with a less expensive agent, e.g. magnesium metal, before rare earth metals are employed.

SUMMARY OF THE INVENTION

The instant invention therefore comprises preparing a ferrous metal network of ferrous metal pieces which is impregnated with rare earth metal, preferably Misch metal useful for treating molten steel, said metal pieces being of random sizes compressed together in a haphazard order forming a metal network of interlocking pieces, said pieces having individual sizes in which the length of the pieces is from ⅛ to 9 inches, the width is from 1/64 to 1 inch, and the thickness is from 1 to 100 mils, and voids between said pieces forming a labyrinth of interstices throughout said network, said metal network having a density of from 6.3 down to 1.2 g/cc, the interstices in said network forming a porosity of from 20% to 85%, said metal network having a short transverse tensile strength of at least 2 psi, said rare earth metal filling said interstices, the amount of rare earth metal employed being from 15% to 80% by weight of the impregnated metal network.

This new composition of matter is prepared by selecting ferrous metal scrap pieces which have a mass bulk density of 0.1 to 1.0 g/cc, said pieces having lengths from ⅛ to 9 inches, widths from 1/64 to 1 inch, and thicknesses from 1 to 100 mils; compacting said pieces into a metal network having a density from 6.3 down to 1.2 g/cc, a porosity of 20% to 85%, and a short transverse tensile strength of at least 2.0 psi, immersing said metal network into a molten bath of rare earth metal to impregnate said network with said metal, the impregnated metal network containing from 15% to 80% rare earth metal by weight of the impregnated network and removing said impregnated network from said molten rare earth metal.

DESCRIPTION OF THE PREFERRED EMBODIMENTS

In order to prepare the ferrous metal network, scrap metal pieces, particularly steel turnings which fall within the following size ranges are selected:

| | |
|---|---|
| length | 1/8 to 9 inches |
| width | 1/64 to 1 inch |
| thickness | 1 to 100 mils |

Scrap metal pieces within this size range usually have a bulk density of from 0.1 to 1.0 g/cc.

In the instant application, these metal pieces are then compressed to form a ferrous metal network having a density of from 1.2 to 6.3 g/cc. As stated previously, the porosity of the network is 20% to 85% and it has a short transverse tensile strength of at least 2.0 psi.

This ferrous metal network is then immersed into molten rare earth metal, preferably Misch metal and held in the molten metal for a few minutes to impregnate the interstices of the metal network. The impregnated body is removed from the molten rare earth metal and it is cooled to solidify the molten rare earth metal.

the impregnated metal network is cooled, preferably in the absence of an oxidizing atmosphere. One preferred method of cooling the impregnated compressed metal body is to immerse the impregnated body into an oil bath.

The final product comprises a porous composition of matter comprising a compacted metal network impregnated with rare earth metal. The composition contains from 15% up to 80% rare earth metal by weight of the total impregnated metal body.

The porous ferrous metal network composition of the instant invention when impregnated with rare earth metal takes up and retains the rare earth metal in the desired amounts, and when used to treat ferrous melts, the metal network releases the rare earth at a desirable rate. The metal network also has a structural strength which is retained as the rare earth metal is released. This is advantageous, since the maintenance of the structural strength is desirable to release the rare earth in a controlled manner. In addition, it is also advantageous to employ this particular type of rare earth metal infiltrated porous body over other types of porous carriers since the residual ferrous metal in the porous body may be dissolved in the molten metal without contaminating the melt with undesirable elements. It has also been found that this particular type of ferrous metal body possesses sufficient strength to withstand handling prior to infiltration, while at the same time possesses a porosity which will hold the desired amount of rare earth metal.

In addition to producing a product which has all of these advantages, the porous body of the instant material may be made with raw materials, which are readily available.

The density of the compacted ferrous metal network before impregnation in the instant application is from 1.2 to 6.3 g/cc, while the density of the scrap metal pieces before compaction was 0.1 to 1.0 g/cc. Metal porous bodies containing amounts of rare earth metal from 15% up to 80% may be produced by this process. Reproducible products are also readily obtained.

It is difficult to produce scrap briquettes with a density above 6.3 g/cc, at densities below 1.2 g/cc the briquette will not be strong.

The scrap metal pieces useful in the instant invention include ductile iron and the like, but more preferably steel. The scrap metal pieces, as previously stated, must fall within the size ranges specified above. If the scrap pieces used in this invention lie outside the specified size range, difficulties may be encountered in infiltrating the metal network and/or the rate of release of the rare earth may not be desirable.

The most desirable type of scrap metal are those which are irregular in shape and have a variety of sizes which fall within the sizes specified. Fine metal turnings, short shovelings and the like are the most desirable.

The compacted metal porous bodies prepared in the instant invention may be impregnated with various rare earth metals or mixtures thereof. Misch metal, a common mixture of rare earths often used in the ferrous industry, contains about 55% cerium, 20% lanthanum and lesser amounts of praseodymium and neodymium and other rare earths. Alloys of rare earths with other elements may also be employed. Alloys particularly desirable to use are Misch metal alloys containing calcium, aluminum, iron, copper, manganese, nickel and cobalt and mixtures of these elements. The term rare earth metal, hereinafter referred to, is meant to include rare earth metals and alloys of rare earth metals. The alloy must occupy the same volume as the 15% up to 80% by weight of the rare earth metal. The amount of alloying elements preferably should be held to less than 25% of the total rare earth metal employed.

Scrap metal generally contains a coating of oil. This coating may be removed before infiltration, if desired. One method of degreasing is by heating the scrap to burn-off the oil. This heating may be done before or after compressing. It is economically advantageous, however, to compress the scrap metal, then heat the compressed metal to remove the oil, and to preheat the metal at the same time before it is introduced into the molten rare earth metal for infiltration.

If the compressed metal is preheated before introduction into molten rare earth metal, care should be taken to prevent the scrap metal from oxidizing excessively. The oxide present can react with rare earth metal, and may consume a significant amount of rare earth metal, thus lowering the efficiency.

It has been found that the weight gain of the scrap metal compressed network due to oxidation should not exceed about 3% and, preferably, not exceed about 1% during the preheating step.

The amount of oxidation may be held within the limits specified, if the preheating temperatue in air is held between about 500°F. and 1000°F. Temperatures up to about 1200°F. may also be employed, if the time of preheating is held to no more than about one hour.

Obviously, the preheating temperature upper limits are not critical, if the preheating is carried out in a non-oxidizing atmosphere.

Care should also be taken in the storage of the rare earth metal infiltrated bodies to avoid reaction of the rare earth metal with moisture. This may be readily accomplished by sealing the infiltrated bodies in a suitable container or placing the infiltrated bodies with a drying agent in a metal can having a tight fitting lid.

In order to describe the instant invention more fully, the following examples are presented:

EXAMPLE 1

In this example the ferrous metal network or briquette was prepared as follows:

Steel turnings were selected which were 5 to 10 mils thick, 1/8 to 7/16 in. in width, and 5/8 to 2 in. in length.

The above turnings were inserted in a compaction chamber 1 in. in diameter by 3 in. high. The turnings were compacted at 6.2 tons/in.² . A typical briquette measured 1.24 in. in diameter by 0.42 in. thick. The density of the briquette was 4.42 g/cm³.

The compacted briquettes were preheated at 800°F. for 30 minutes. After preheating the compacted briquettes were individually immersed in a melt of Misch metal at 810°C. (1490°F.) for 1½ minutes.

A typical briquette weighed 37.7 g after preheating. The same briquette weighed 62 g after immersion in the Misch metal melt and contained 39.2% Misch metal by weight.

EXAMPLE 2

In this example, briquettes of the scrap steel turnings were prepared in the same manner as those described in Example 1 and the briquettes had similar properties to those of Example 1. The briquettes were preheated at 800°F. for 30 minutes, and the compacted briquettes were individually immersed in a molten alloy containing 95.5% Misch metal and 4.5% iron at 800°–850°C. for 10 minutes.

A typical briquette weighed 33.1 g after preheating. The same briquette weighed 48.5 g after immersion in the Misch metal — 4.5% iron and contained 31.8% Misch metal — iron by weight.

EXAMPLE 3

Briquettes of the same compressed steel turnings were prepared in the manner described above. The compacted briquettes were preheated at 800°F. and were individually immersed in a molten Misch metal alloy containing 4.5% iron and 3% aluminum. The molten alloy had a temperature of 700°–760°C. and the briquettes were immersed for 10 minutes.

A typical briquette weighed 34.6 g after preheating. The same briquette weighed 61.5 g after immersion in the Misch metal melt containing 4.5% Fe and 3% Al. The infiltrated briquette contained 43.7% Misch metal — iron-aluminum alloy.

EXAMPLE 4

In this example the procedure of Example 1 was repeated except that the briquette was immersed in molten Misch metal containing 11% aluminum at 850°C. for 10 minutes.

The infiltrated briquette contained 49.3% (Misch metal — 11% aluminum) by weight.

EXAMPLE 5

In this example a briquette was immersed in molten Misch metal containing 8.5% nickel at 800°F. for 30 minutes. The infiltrated briquette contained 41.4% (Misch metal — 8.5% nickel).

The infiltrated briquettes containing Misch metal and alloys of Misch metal prepared in Examples 1–5 when added to molten iron release the Misch metal quiescently.

From the above description and by the examples presented, a new and novel product has been produced which comprises a ferrous metal network having sufficient strength which may be infiltrated with the desired percentages of rare earth metal and rare earth metal alloys.

While this invention has been described and illustrated by the examples shown, it is not intended to be strictly limited thereto, and other variations and modifications may be employed within the scope of the following claims.

We claim:

1. A composition of matter comprising a mass of ferrous metal pieces and rare earth metal, useful for treating molten steel, said scrap pieces being of random sizes compressed together in a haphazard order forming a metal network of interlocking pieces, said pieces having individual sizes in which the length of the pieces is from ⅛ to 9 inches, the width is from 1/64 to 1 inch, and the thickness is from 1 to 100 mils, and voids between said pieces forming a labyrinth of interstices throughout said network, said metal network having a density of from 1.2 to 6.3 g/cc, the interstices in said network forming a porosity of from 20% to 85%, said metal network having a short transverse tensile strength of at least 2 psi, said rare earth metal filling said interstices, the amount of rare earth metal in said interstices being from 15% up to 80% by weight of the total weight of said metal network containing the rare earth metal.

2. Composition according to claim 1 in which said rare earth metal impregnated in said network is Misch metal.

3. Composition according to claim 1 in which said rare earth metal impregnated in said network is an alloy of Misch metal.

4. Composition according to claim 3 in which the alloying element in said Misch metal is selected from the group consisting of calcium, aluminum, iron, copper, manganese, nickel and cobalt and mixtures of these elements.

5. A process for producing a porous ferrous metal network impregnated with rare earth metal which comprises selecting ferrous metal scrap pieces which have a mass bulk density of 0.1 to 1.0 g/cc, said pieces having lengths from ⅛ to 9 inches, widths from 1/64 to 1 inch, and thicknesses from 1 to 100 mils; compacting said pieces into a metal network having a density from 1.2 to 6.3 g/cc, a porosity of 20% to 85%, and a short transverse tensile of at least 2.0 psi, immersing said metal network into a molten bath of rare earth metal to impregnate said network with rare earth metal, the impregnated metal network containing from 15% up to 80% by weight of the impregnated network and removing said impregnated network from said molten rare earth metal.

6. A process according to claim 5 in which said rare earth metal impregnated in said porous metal network is Misch metal.

7. A process according to claim 6 in which said rare earth metal impregnated in said porous metal network is an alloy of Misch metal.

8. A process according to claim 6 in which the alloying element in said Misch metal is selected from the group consisting of calcium, aluminum, iron, copper, manganese, nickel and cobalt and mixtures of these elements.

* * * * *